Feb. 6, 1968    D. C. GEARIN    3,367,675
COMPACT FOLDABLE TRAILER
Filed July 25, 1966    3 Sheets-Sheet 1

INVENTOR.
DEWEY C. GEARIN
BY
Townsend and Townsend
ATTORNEYS

Feb. 6, 1968 D. C. GEARIN 3,367,675
COMPACT FOLDABLE TRAILER
Filed July 25, 1966 3 Sheets-Sheet 2

INVENTOR.
DEWEY C. GEARIN
BY
Townsend and Townsend
ATTORNEYS

Feb. 6, 1968   D. C. GEARIN   3,367,675
COMPACT FOLDABLE TRAILER
Filed July 25, 1966   3 Sheets-Sheet 3
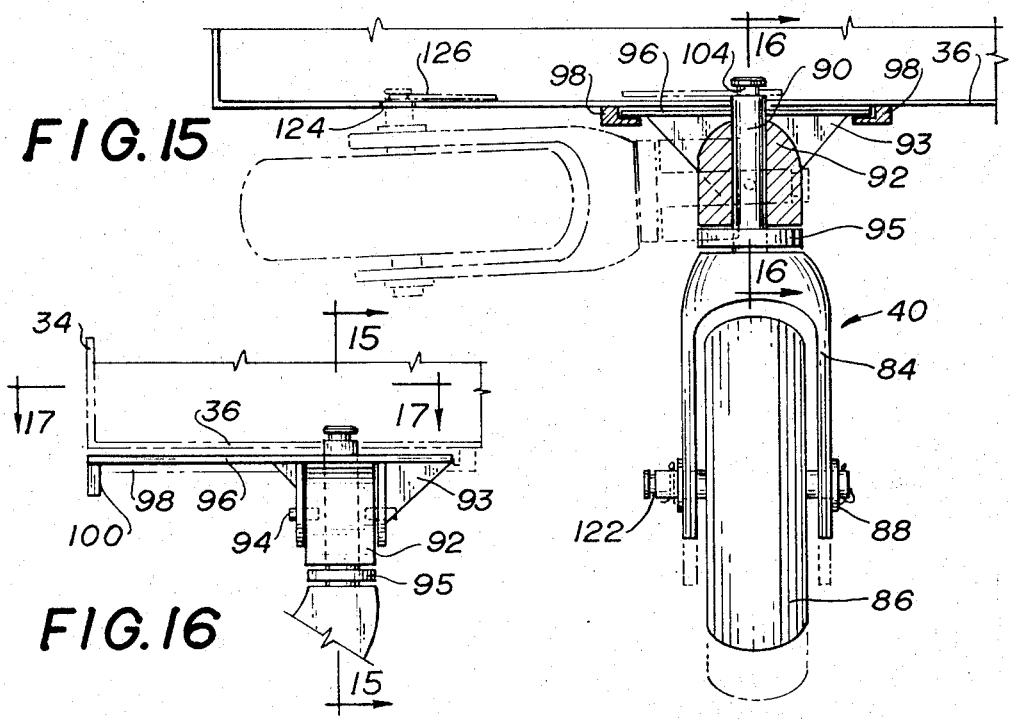
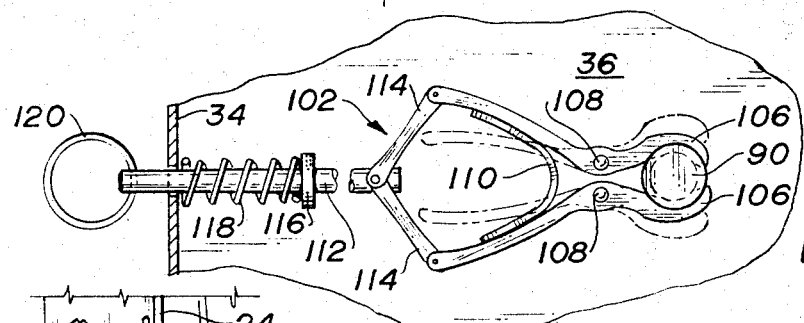
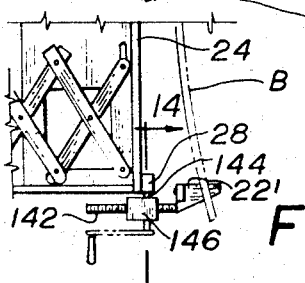
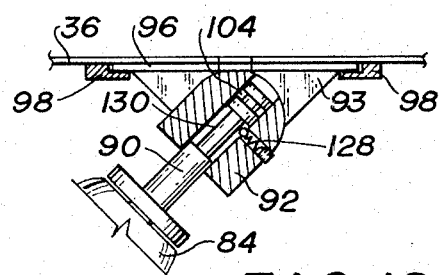
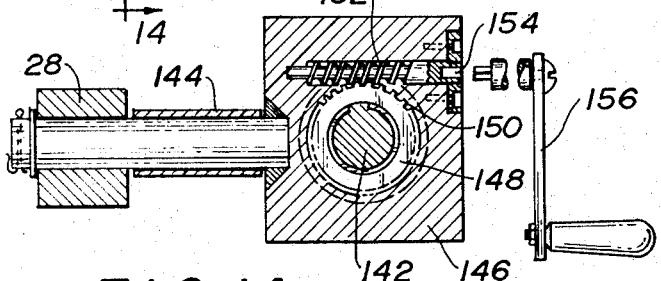
INVENTOR.
DEWEY C. GEARIN
BY Townsend and Townsend
ATTORNEYS United States Patent Office 3,367,675
Patented Feb. 6, 1968

3,367,675
COMPACT FOLDABLE TRAILER
Dewey C. Gearin, Porterville, Calif., assignor to Compact Products, Inc., San Francisco, Calif., a corporation of California
Filed July 25, 1966, Ser. No. 567,511
10 Claims. (Cl. 280—34)

This invention relates to a compact foldable trailer adapted to be drawn by a vehicle such as an automobile.

The invention is described in more detail hereinafter in a specific embodiment that includes a plurality of rigid bars pivotally joined to one another to form a so-called lazy tong structure. Plural lazy tong structures are provided according to the invention and form the bottom and side walls of the trailer. Accordingly, the trailer can be folded up and stored in an automobile when it is not in use.

A feature and advantage of the foldable structure is that the trailer can be fully extended when large loads are being carried and only partially extended when small loads are being carried. Partial extension of the trailer is advantageous in that it makes easier the handling of the trailer while it is being towed.

Although a bottom panel formed by a lazy tong structure in accordance with the present invention is sufficient for carrying loads of relatively large physical size, smaller loads tend to fall through the spaces between the bars that constitute the lazy tong structure. Accordingly, the present invention includes a collapsible or foldable bottom panel which is adapted for placement upon the lazy tong structure; the lazy tong structure acts to retain the trailer in a rigid manner and the bottom panel prevents small loads from passing through the inter-bar spaces.

Another feature and advantage of the present invention is that the trailer when in use is supported on a wheel, which wheel is foldable and/or removable when it is desired to fold or collapse the trailer. By removal of the wheel the collapsed trailer can be stored in a much smaller space. The present invention affords specific mechanisms and sub-combinations which assure secure connection of the wheel to the trailer and also afford simple and rapid removal of the wheel from the trailer.

Still another feature and advantage of the present invention resides in an improved hitch structure for connecting the trailer onto the towing vehicle. This feature and advantage is particularly important when the trailer is being towed by an automobile which has at the rear thereof either a trunk door or, in the case of automobiles having the engine at the rear, an engine compartment door. The present invention provides a trailer hitch that permits movement of the trailer toward and away from the rear of the automobile without requiring disconnection of the trailer from the automobile. Consequently, access to the rear trunk or engine compartment is readily had without detaching the trailer from the automobile.

Other objects, features and advantages will be more apparent upon referring to the following specification and accompanying drawings in which:

FIG. 13 is a fragmentary plan view of an alternate form of apparatus for adjustably securing the trailer to a drawing vehicle;

FIG. 14 is a cross-sectional view taken along line 14—14 of FIG. 13;

FIG. 15 is an elevation view taken substantially along line 15—15 of FIG. 2;

FIG. 16 is a cross-sectional view taken along line 16—16 of FIG. 15;

FIG. 17 is a fragmentary plan view at enlarged scale taken along line 17—17 of FIG. 16; and FIG. 18 is a partial view similar to FIG. 15 showing an operative detail of the wheel mounting structure of the present invention.

Figure 1:
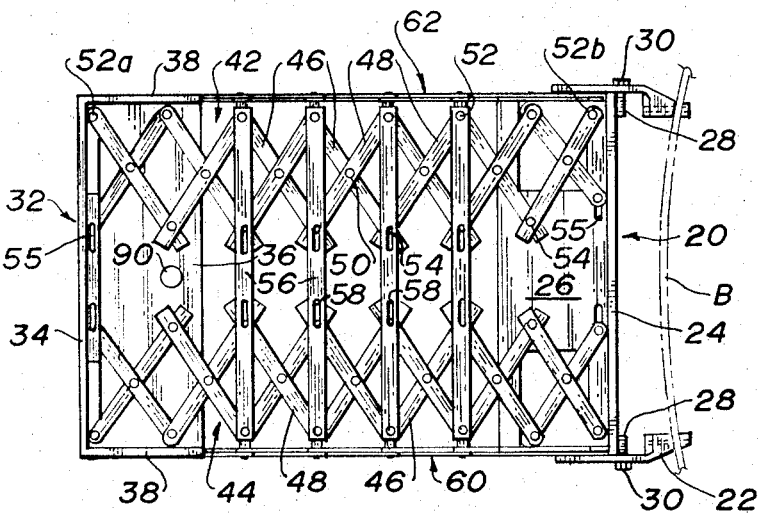
FIG. 1 is a plan view of a trailer constructed according to the present invention in expanded or operable position.

Referring more particularly to the drawings, reference numeral 20 indicates a rigid front section of the trailer attached by trailer hitch members 22 to an automobile bumper B. Front section 20 includes a vertically extending panel 24 that forms the front wall of the trailer body and a horizontal plate 26 secured to the lower edge of the panel and extending perpendicularly rearward therefrom. Front panel 24 has secured to the forward face thereof and adjacent the level of plate 26, a pair of blocks 28, which are provided with transversely extending tapped holes for receiving bolts 30 to attach the trailer to hitch members 22.

A rear section 32 is provided and includes a vertical rear panel 34 which forms the rear wall of the trailer body in confronting relation to front panel 24. Secured to the lower edge of rear panel 34 and extending perpendicularly forwardly therefrom is a horizontal plate 36. Vertical panel 34 and horizontal plate 36 are rigidly secured in a perpendicular relationship by opposed side panels 38. Horizontal rear plate 36 is preferably of somewhat greater width than horizontal front plate 26 so that the latter fits within rear section 32 when the trailer is folded or collapsed. A wheel assembly 40 is mounted on horizontal plate 36 and supports the rear of the trailer for rolling movement over a road surface.

Extending between rear horizontal plate 36 and front horizontal plate 26 and defining the bottom structural wall for the trailer body are horizontally extending lazy tong assemblies 42 and 44. As can be seen most clearly from FIG. 1, the lazy tong structures are substantially identical and are symmetrical with respect to the longitudinal center line of the trailer. Referring to lazy tong structure 42 by way of example, a plurality of bars 46 forms a first plurality of parallely disposed bars which are pivotally connected to respective bars 48 which form a second group of mutually parallel bars. Corresponding bars 46 and 48 are pivotally connected at their midpoints 50 and alternate bars of the respective groups are pivotally joined at their outer ends 52. The outer end of the rearwardmost bar 46 is pivotally joined at 52a to rear horizontal plate 36 and the outer end of the forwardmost bar 48 is pivotally joined at 52b to front horizontal plate 26. The inner ends of alternate bars 46 and 48 are pivotally joined at 54, thus forming a foldable lazy tong assembly which, per se, is conventional. Front and rear horizontal plates 26 and 36 are slotted at 55 to slidably support the inner ends of the front and rear ends of respective bars 46 and 48.

Extending transversely of the trailer body between aligned pairs of pivot connections 52 of lazy tong subassemblies 42 and 44 are rigid cross bars 56. Each cross bar is provided with a pair of slots 58 disposed symmetrically of the longitudinal center line of the trailer body and elongated in a direction perpendicular to such center line for slidably supporting pivot connections 54 of the inner ends of bars 46 and 48. Because slots 55 and 58 are elongated, pivot connections 54 can move therein and permit the trailer to be folded and unfolded by moving rear section 32 toward and away from front section 20.

Forming the side walls of the trailer body are vertically oriented lazy tong assemblies 60 and 62, each of which includes a first set of mutually parallel bars 64 connected to corresponding bars 66 of a second group of mutually parallel bars. Each bar 64 is connected at its midpoint to the midpoint of a corresponding bar 66 by a pivotal connection 68. Alternate bars 64 are connected to respective bars 68 at their upper ends by a pivot connection 70 and at their lower ends by a pivot connection 72. A plurality of angle brackets 74 are provided, each of which includes a vertically extending leg 74V joined to pivot connection 72 and a horizontally extending leg 74H joined to pivot connection 52. Thus the side panels formed by lazy tong assemblies 60, 62 are securely joined to bottom panels formed by lazy tong structures 42 and 44; such connection does not in any way interfere with folding or collapsing of the structure.

Figure 2:
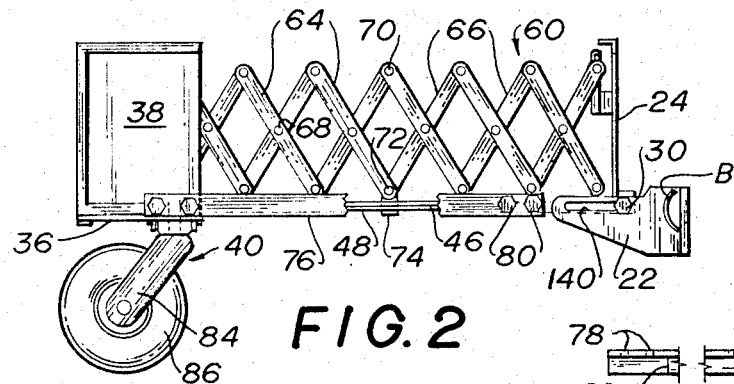
FIG. 2 is a side elevation view of the trailer of FIG. 1.
Figure 3:
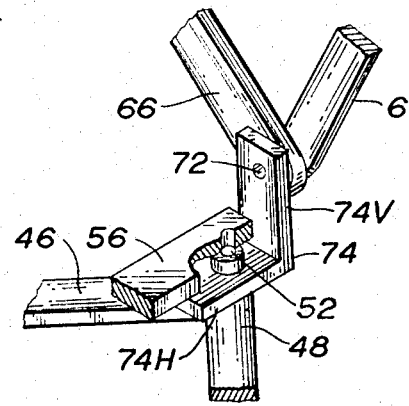
FIG. 3 is a fragmentary perspective view of a pivotable or foldable joint in the lazy tong structure of the trailer.
Figure 4:
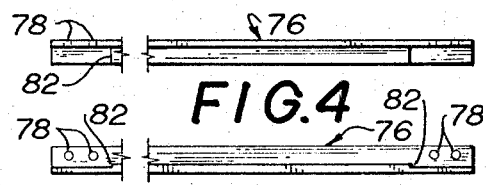
FIG. 4 is a top view of a rigid member used to rigidly secure the trailer in a fully expanded position.
Figure 5:
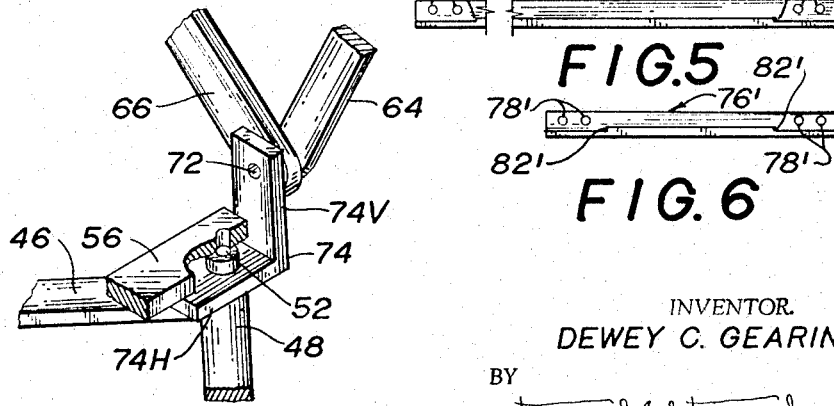
FIG. 5 is a side elevation view of the member of FIG 4.

The trailer is supported in an extended load carrying position by a pair of substantially identical rigid elongate members, one of which is shown in FIGS. 2, 4 and 5 at 76. Each longitudinal end of member 76 is provided with a pair of spaced apart holes 78; front section 20 and rear section 32 each have corresponding tapped holes therein for receiving bolts 80 which are first passed through holes 78 to secured the elongate rigid member to the front and rear sections. Elongate member 76 has a shoulder 82 at each end thereof for abutting against the inner edges of horizontal plates 26 and 30 of the respective front and rear sections. The shoulder not only contributes to the rigidity of the structure but materially simplifies the installation of the elongate members when the trailer is being assembled from a folded position in that when the inner edges of front and rear horizontal plates 26, 36 abut shoulder 82, holes 78 are aligned with corresponding tapped holes in front and rear sections 20, 32.

Figure 6:
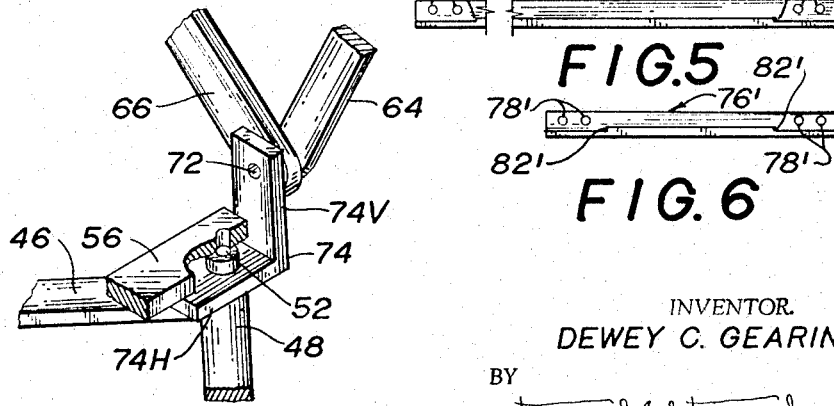
FIG. 6 is a side elevation view of a smaller securing member for use with the trailer in a partially expanded position.
Figure 7:
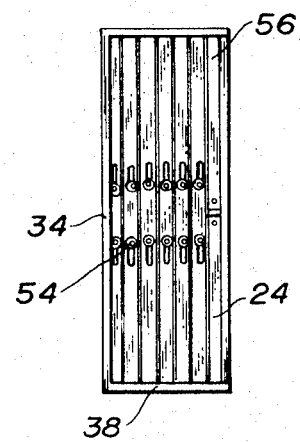
FIG. 7 is a plan view of the trailer of the present invention in a folded condition.
Figure 8:
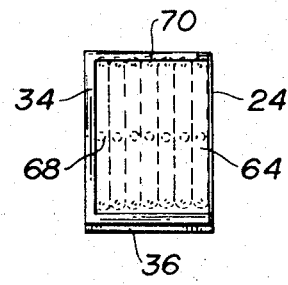
FIG. 8 is a side elevation view of the trailer of FIG. 7.

A second pair of elongate members exemplified at 76' in FIG. 6 is provided with spaced bolt holes 78' at each end thereof and shoulders 82' adjacent each end. The spacing between the pairs of bolt holes 78' is approximately one-half the spacing between bolt holes 78 so that elongate members 76' serves to retain the trailer at a more or less half-opened position to accommodate loads of relatively small size.

As seen more clearly in FIGS. 15–18 wheel assembly 40 includes a bifurcated fork 84 the furcations of which define therebetween a space for a wheel 86 rotatively supported on the fork by an axle 88. Extending upwardly from fork 84 and rigid therewith is a shaft 90 which, as can be seen most clearly in FIG. 2, is oriented obliquely of the fork to afford caster-like action to the wheel assembly. Shaft 90 is received in a bored block 92 which is pivotally supported in a yoke 93 by pins 94. A thrust bearing 95 is provided for ensuring rotation of the fork relative block 92. Yoke 93 is rigidly secured to a rectangular plate 96 which is slidably received in a groove defined between parellelly transversely spaced apart channels 98 mounted on the bottom face of plate 36. Plate 96 is provided with an end flange 100, see FIG. 16, which affords a hand grip to facilitate sliding movement of the plate into and out of the slot defined between channels 98.

Wheel assembly 40 is secured in operative relation by a releasable locking mechanism 102 carried on the upper surface of horizontal plate 36. See FIG. 17. For cooperating with the locking mechanism shaft 90 has in the upper end thereof an annular groove 104. The locking mechanism includes pivotally mounted jaw members 106 which engage the slot to inhibit movement of shaft 90 in a direction axially thereof. Jaw members 106 are secured to horizontal plate 36 for pivotal movement in a horizontal plane by pivot pins 108. A leaf spring 110 is provided between the ends of jaw members 106 remote from shaft 90 for resiliently biasing the jaw members into engagement with groove 104. An operating rod 112 has on the inner end thereof links 114, the opposite ends of which are joined to jaw members 106. It will be seen that outward movement of rod 112, leftward movement as viewed in FIG. 17, will spread jaws 106 against the bias of spring 110 to permit its disengagement of the jaws from groove 104, and that the spring biases the jaws into engagement with the groove. Rod 112 carries a collar 116 for bearing against a compression spring 118 circumscribing the rod between the collar and panel 34 to provide an additional inward resilient biasing force.

Exterior of the trailer body, i.e., to the left of panel 34 as viewed in FIG. 17, rod 112 is provided with a finger ring 120 to afford a grip on the rod when it is desired to disengage jaws 106 from groove 104 in shaft 90.

The entire wheel assembly can be removed by releasing the locking mechanism 102, withdrawing shaft 90 from block 92, and sliding plate 96 out of the slot defined on the bottom of panel 36 by channels 98. Alternatively, the wheel assembly can be folded upwardly while remaining attached to the trailer body by partial withdrawal of shaft 90 and pivotal movement of fork 84 and block 92 about pins 94. Axle 88 is provided with an extension at one end thereof that defines an annular groove 122 which, in the folded position shown by broken lines in FIG. 15, is received in a hole 124 formed in plate 36. A releasable locking mechanism shown diagrammatically at 126 and being substantially identical to locking mechanism 102 is provided adjacent hole 124 for locking wheel assembly in the folded position. Thus, the present invention provides versatility, in that the entire wheel assembly can be removed or only folded up against the bottom surface of plate 36.

A modification of the wheel mounting assembly which materially expedites movement to the folded position depicted by broken lines in FIG. 15 is shown in FIG. 18 to include a spring urged detent mechanism 128 carried in block 92 and a reduced diameter portion 130 on shaft 90. The detent mechanism limits axial movement of shaft 90 in bored block 92 unless sufficient force is applied to the shaft to overcome the spring tension in the detent mechanism. Thus, when it is desired to remove the fork 84 from bored block 90, 92, for example, for repairs on wheel 86 or bearing 95, additional pressure axially of shaft 90 will permit such removal.

Figure 9:
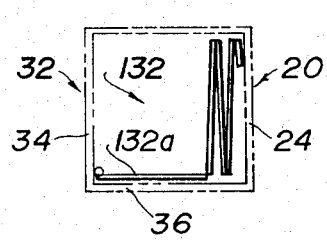
FIG. 9 is a partially schematic side elevation view of the trailer in a folded position showing one form of a bottom panel.
Figure 10:
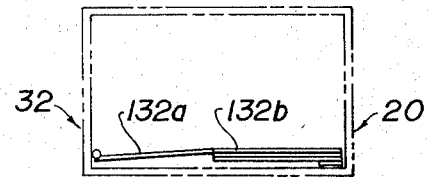
FIG. 10 is similar to FIG. 9 showing the trailer in a partially expanded condition.
Figure 11:
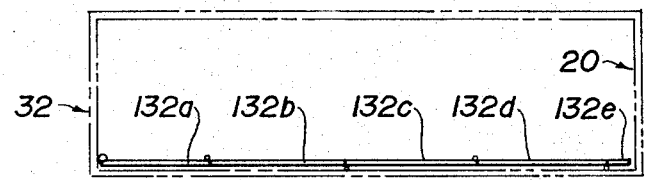
FIG. 11 is similar to FIG. 9 showing the trailer in a fully expanded condition.

Although the bottom wall of the trailer body as formed by lazy tong structures 42 and 44 and cross bars 56 is adequate to support large loads, small loads are likely to drop through spaces between those members. According to the present invention, as more fully shown in FIGS. 9–11, a foldable bottom panel structure 132 is provided for placement in the trailer body in overlying relationship to lazy tong assemblies 42 and 44 and cross bars 56. The bottom panel structure is formed of plural panel segments hingedly joined together, the rearwardmost segment 132a being pivotally connected to rear section 32 adjacent and parallel to the intersection between vertical panel 34 and horizontal plate 36. As shown in FIG. 9 with the trailer in a folded position, panel section 132a resides in a horizontal position and the remaining panel sections fold into a vertical position to permit rear section 32 to be moved toward front section 20. Because the panel sections reside in a vertical position at the forward portion of the folded trailer body, space within the body is provided for storing wheel assembly 40 and elongate members 76 and 76'. When the trailer is moved to the half extended position by employment of elongate members 76', see FIG. 10, a solid bottom panel is formed by sections 132a and 132b, the remaining sections lying beneath section 132b to define a generally flat uninterrupted surface. When the trailer is set up in a fully extended position by employment of elongate members 76, bottom panel structure 132 is fully extended, see FIG. 11, and all panel sections 132a, 132b, 132c, 132d and 132e cooperate to form a smooth solid bottom panel for supporting small loads in the trailer. Thus, bottom panel structure 132 does not interfere with the folding and unfolding of the trailer structure and provides a closed bottom panel for all expanded positions of the trailer body.

Figure 12:
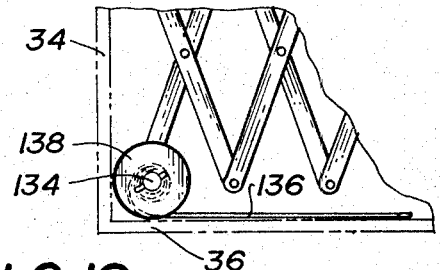
FIG. 12 is a fragmentary view showing an alternate form of bottom panel.

A modified form of bottom panel structure is shown schematically in FIG. 12 as including a window shade type, spring loaded roller 134 transversely spanning the space between side panels 38 and carrying a rollable sheet 136 which is unwound from roll 134 by an amount proportional to the degree of expansion of the trailer. Tubular housing 138 is provided for the roller and the sheet to protect them from damage. In one trailer designed according to the present invention sheet 136 is formed of stainless steel of sufficient thinness that it can be rolled onto roll 134 without permanently distorting the sheet. Stainless steel is a particularly satisfactory material for sheet 136 because it is non-flammable, an important characteristic since the trailer, at least adjacent the forward end thereof, is often subjected to high temperature exhaust gases from the vehicle that is towing the trailer. Of course, when a trailer equipped as shown in FIG. 12 is moved to the folded position, sheet 136 is rapidly wound onto roll 134 because of the spring biased force on the roll.

Referring to FIG. 2 it will be noted that trailer hitch member 22 includes a horizontally extending elongate groove 140 which, in cooperation with bolt 30 provides means for moving the trailer toward and away from bumper B and the vehicle of which the bumper is a part. An alternative means for affording such adjustment is shown in FIGS. 13 and 14 wherein a trailer hitch member 22' includes rearwardly extending jack screw 142. For providing connection between the trailer and jack screw 142, block 28 carries transversely outwardly extending pivot pin 144 to the outer end of which is pivotally mounted a housing 146. Housing 146 is centrally bored so as to receive therein a rotatable sleeve 148, which sleeve has a central threaded opening for threadedly engaging jack screw 142. The sleeve has on the outer periphery thereof a series of gear teeth 150, which teeth are engaged by a worm 152 which is supported in a suitably located transverse bore in casing 146. The outer end of worm 152 is provided with a socket opening 154 for receiving a hand crank 156 therein. Thus, it will be seen that when crank 156 is inserted in socket 154 and rotated, sleeve 148 is rotated through the action of worm 152, and thus casing 146 and the trailer body will be moved toward and away from bumper 8, depending on the direction of rotation of the crank. During travel over a road surface better stability and control of the trailer is secured with casing 146 positioned at its extreme forward position, i.e., close to bumper B. On the other hand, when access to a rear trunk or engine compartment is desired, which access would normally be prevented by the proximity of vertical panel 24 to the door for such compartment, crank 156 is rotated so as to move casing 146 and the trailer rearwardly along jack screw 142 until sufficient clearance for opening the door is achieved.

Thus it will be seen that the present invention provides a trailer which combines foldability and versatility with a rugged sturdy construction. For example, in one trailer designed according to the present invention the trailer when in a folded position fits behind the rear seat of a 1966 model Volkswagen sedan. Such exemplary trailer is readily removable from the storage position and can be quickly and securely expanded to the operating position.

Although one embodiment of the present invention has been shown and described, it will be obvious that other adaptations and modifications can be made without departing from the true spirit and scope of the invention.

What is claimed is:

1. A foldable trailer adapted to be drawn by a vehicle comprising a front section having a horizontal plate and a panel extending vertically upwardly from said plate, means for attaching said front section to the vehicle, a rear section having a horizontal plate and a vertical panel rigid with said horizontal plate and extending vertically upwardly therefrom, first and second horizontally disposed lazy tong structures joined to respective said horizontal plates and extending between said forward section and said rear section, each said lazy tong structure comprising a plurality of bars each having a first end and a second end, said plurality of bars constituting first and second groups, means for pivotally joining the midpoint of the bars of said first group to the midpoint of corresponding bars of said second group, and means for pivotally connecting the ends of alternate bars of said first group to the ends of corresponding alternate bars of said second group, third and fourth lazy tong structures substantially identical to said first and second lazy tong structures and extending between said vertically extending panels on opposite sides thereof to define vertical side walls for said trailer, a plurality of angle brackets pivotally joining the first ends of the bars in said first and second lazy tong structures to the first end of corresponding bars in said third and fourth lazy tong structures, a cross bar spanning a transversely aligned pair of angle brackets, said cross bar being slotted centrally thereof for slidably supporting the second ends of the bars of said first and second lazy tong structures, and means for rigidly spacing said front section from said rear section in an expanded position, said spacing means being removable to permit folding of the trailer.

2. A trailer according to claim 1 wherein said attaching means includes means for selectively positioning the trailer toward and away from the vehicle.

3. A trailer according to claim 1 wherein said spacing means comprises a pair of elongate rigid bars and means for detachably connecting said bars in spanning relation between said front section and said rear section.

4. A trailer according to claim 1 in combination with a wheel for supporting the trailer for rolling movement over a surface and means for removably attaching said wheel to the horizontal plate of said rear section.

5. A trailer according to claim 4 wherein said wheel attaching means comprises means defining a slot on the lower surface of said horizontal plate, a generally rectangular plate slidable in said slot, a yoke formed rigidly with said rectangular plate and depending therefrom, a fork mounted for pivotal movement in said yoke and including a shaft extending upwardly therefrom, said rectangular plate and said horizontal plate each having a hole therein positioned so that when the rectangular plate is in said slot said holes are aligned, said shaft being slidably insertable in said aligned holes, means for retaining said shaft in said holes, and a wheel rotatively mounted in said fork.

6. A trailer according to claim 5 wherein said shaft retaining means comprises an annular groove formed in said shaft, a pair of jaws pivotally mounted on said horizontal plate and formed to enter said groove, means for resiliently biasing said jaws into said groove, and means for pivotally moving said jaws against said biasing means to disengage the jaws from said groove.

7. A trailer according to claim 5 in combination with detent means for limiting the range of sliding movement of said shaft.

8. A trailer according to claim 1 in combination with a collapsible generally imperforate sheet for overlying said first and second lazy tong structures to form a bottom panel for said trailer.

9. A trailer according to claim 8 wherein said sheet comprises a plurality of substantially rigid panel sections and means for hingedly joining said sections together in an accordion-fold manner.

10. A trailer according to claim 8 wherein said collapsible sheet comprises a piece of rollable material and wherein said trailer includes a spring biased roller mounted transversely thereof and adjacent the bottom thereof for rollably storing said piece thereon.

References Cited
UNITED STATES PATENTS

| | | | |
|---|---|---|---|
| 797,077 | 8/1905 | Shaw | 248—421 |
| 2,490,014 | 12/1949 | Brand | 296—26 |
| 2,500,589 | 3/1950 | Wuerthner | 280—36 |
| 2,805,905 | 9/1957 | Levitan et al. | 311—39 |

LEO FRIAGLIA, *Primary Examiner.*

J. SIEGEL, *Assistant Examiner.*